US008702328B2

(12) United States Patent
Cronin et al.

(10) Patent No.: US 8,702,328 B2

(45) Date of Patent: Apr. 22, 2014

(54) DESKTOP CARD PRINTER

(75) Inventors: Patrick Charles Cronin, Bloomington, MN (US); Peter David Schuller, Elko, MN (US); David Evert Wickstrom, Bloomington, MN (US); Lyle Cecil Bungert, Lakeville, MN (US); Jerry L. Steinbach, Champlin, MN (US)

(73) Assignee: DataCard Corporation, Minnetonka, MN (US)

(*) Notice: Subject to any disclaimer, the term of this patent is extended or adjusted under 35 U.S.C. 154(b) by 321 days.

(21) Appl. No.: 13/037,578

(22) Filed: Mar. 1, 2011

(65) Prior Publication Data

US 2011/0217109 A1 Sep. 8, 2011

Related U.S. Application Data

(60) Provisional application No. 61/311,111, filed on Mar. 5, 2010.

(51) Int. Cl.

| | |
|---|---|
| ***B65H 1/06*** | (2006.01) |
| ***B65H 3/24*** | (2006.01) |
| ***B65H 3/46*** | (2006.01) |
| ***G06K 17/00*** | (2006.01) |

(52) U.S. Cl.

USPC ............................ 400/601; 271/165; 271/166

(58) Field of Classification Search

CPC .............. B65H 3/46; B65H 1/06; B65H 3/24; G06K 17/00

USPC ................................... 400/601; 271/165, 166

See application file for complete search history.

(56) References Cited

U.S. PATENT DOCUMENTS

| | | | | |
|---|---|---|---|---|
| 3,583,699 A * | 6/1971 | Campbell | ..................... | 271/135 |
| 3,612,833 A * | 10/1971 | Davis | ............................ | 235/448 |
| 3,807,303 A * | 4/1974 | Petersen | .................... | 101/132.5 |
| 3,991,998 A * | 11/1976 | Banz et al. | .................... | 271/125 |

(Continued)

FOREIGN PATENT DOCUMENTS

| | | | | |
|---|---|---|---|---|
| JP | 04080152 A * | 3/1992 | ............... | B65H 4/44 |
| JP | 05147771 A * | 6/1993 | ............... | B65H 7/06 |

(Continued)

OTHER PUBLICATIONS

International Search Report for international application No. PCT/US2011/026775, dated Nov. 18, 2011 (3 pages).

(Continued)

*Primary Examiner* — Judy Nguyen
*Assistant Examiner* — Nguyen Ha
(74) *Attorney, Agent, or Firm* — Hamre, Schumann, Mueller & Larson, P.C.

(57) ABSTRACT

A desktop card print having an improved automatic card feed hopper that employs a card picking mechanism that includes an automatic gate mechanism in combination with a card edge assist picker while providing a card exception slot for manual feeding of a card, a removable ribbon cassette that employs a magnetic encoder mechanism for tracking the motion of a ribbon mounted on the ribbon cassette, a scanning station that is configured and arranged to capture an image of one or more surfaces of the card as it passes the scanner, and a power take-off (PTO) gear adjacent the rear end of the printer for use in driving an additional processing mechanism to be mounted at the rear of the printer.

9 Claims, 14 Drawing Sheets

(56) References Cited

U.S. PATENT DOCUMENTS

| | | | | |
|---|---|---|---|---|
| 3,999,747 | A * | 12/1976 | Digilio et al. | 271/135 |
| 4,021,032 | A * | 5/1977 | Gross et al. | 271/166 |
| 4,068,580 | A * | 1/1978 | Selhofer | 101/53 |
| 4,463,942 | A * | 8/1984 | Newsome | 271/12 |
| 5,000,453 | A * | 3/1991 | Stevens et al. | 273/149 R |
| 5,667,355 | A * | 9/1997 | Gamperling | 414/797.7 |
| 5,709,484 | A | 1/1998 | Dorner | |
| 5,857,588 | A * | 1/1999 | Kasper | 221/274 |
| 5,950,865 | A * | 9/1999 | Menes | 221/232 |
| 6,098,840 | A * | 8/2000 | Ito et al. | 221/232 |
| 6,719,198 | B2 * | 4/2004 | Bretl et al. | 235/380 |
| 6,932,527 | B2 * | 8/2005 | Pribula et al. | 400/621 |
| 6,997,629 | B2 | 2/2006 | Bungert et al. | |
| 7,398,972 | B2 | 7/2008 | Schuller et al. | |
| 7,434,728 | B2 | 10/2008 | Paulson et al. | |
| 2004/0125201 | A1 * | 7/2004 | Haas et al. | 347/262 |
| 2005/0104281 | A1 * | 5/2005 | Stender et al. | 271/185 |
| 2010/0001459 | A1 * | 1/2010 | Ohta et al. | 271/145 |

FOREIGN PATENT DOCUMENTS

| | | | | |
|---|---|---|---|---|
| JP | 08147420 | A * | 6/1996 | G06K 13/077 |
| JP | 10226433 | A * | 8/1998 | B65H 3/065 |
| JP | 10293816 | A * | 11/1998 | B65H 3/24 |
| JP | 2000076390 | A * | 3/2000 | G06K 17/00 |
| JP | 2003-072122 | | 3/2003 | |
| JP | 2007-190778 | | 8/2007 | |
| KR | 10-0418096 | | 1/2004 | |
| KR | 10-0894092 | | 4/2009 | |

OTHER PUBLICATIONS

Written Opinion for international application No. PCT/US2011/026775, dated Nov. 18, 2011 (3 pages).

* cited by examiner

DESKTOP CARD PRINTER

PRIORITY DATA

This application claims the benefit of U.S. Provisional Patent Application Ser. No. 61/311,111 filed on Mar. 5, 2010, which is incorporated by reference in its entirety.

FIELD

This disclosure relates to plastic card processing equipment, particularly desktop card printers, that perform at least one processing operation, for example printing or other processing operations, on plastic cards such as credit cards, driver's licenses, identification cards and the like.

BACKGROUND

The use of desktop card processing equipment for processing plastic cards is well known. The processing operation(s) performed on the plastic card by known desktop card processing equipment includes one or more of printing, laminating, magnetic stripe encoding, programming of a chip embedded in the card, card flipping or duplexing, and the like. One example of a desktop card processing machine is disclosed in U.S. Pat. No. 7,398,972.

SUMMARY

Improvements to a desktop card processing machine are described. The desktop card processing machine can also be referred to as a desktop card printer even though an actual printing function need not be performed. The processing functions that the desktop card printer is designed to perform include, but are not limited to, monochromatic or multi-color printing, card scanning, laminating, magnetic stripe encoding, programming of a chip embedded in the card, and card flipping or duplexing.

The term plastic cards as used herein includes data bearing plastic cards such as credit cards, driver's licenses, identification cards, employee badges, loyalty cards and the like.

In one embodiment, an improved automatic card feed hopper is described that is used with the desktop card printer. The card feed hopper employs a card picking mechanism that includes an automatic gate mechanism in combination with a card edge assist picker, while providing a card exception slot for manual feeding of a card.

One version of the desktop card printer includes a housing having a first end and a second end, a first side surface and a second side surface, and a top surface. A card hopper is mounted to the housing at the first end, with the card hopper including a card input hopper portion that is configured to hold a plurality of cards to be processed by the desktop card printer. The card hopper includes a card picking mechanism that is configured and arranged to pick and feed a single card from the plurality of cards within the card input hopper portion into the desktop card printer for processing. The card picking mechanism includes an automatic gate mechanism that is disposed at a discharge side of the card input hopper portion adjacent first edges of the cards and is configured and arranged to control the discharge of cards from the card input hopper portion into the desktop card printer. The card picking mechanism also includes a card edge assist mechanism that is configured and arranged to engage a second edge of a card to be picked to help separate the card to be picked from the remainder of the cards in the card input hopper portion. The card printer also includes a card output, a card processing mechanism within the housing, and a card transport mechanism within the housing that is configured and arranged to receive a picked card from the card input hopper portion and to transport the picked card within the housing to the card processing mechanism and to the card output.

In another embodiment, a ribbon cassette is provided that employs a magnetic encoder mechanism for tracking the motion of a ribbon mounted on the ribbon cassette. The ribbon can be any type of ribbon used in the desktop card printer, for example a print ribbon or a laminate ribbon. The ribbon cassette also forms a portion of the top surface of the housing of the desktop card printer.

One version of the ribbon cassette includes a ribbon supply spindle rotatably mounted on a bar for receiving a supply spool of a ribbon material, a ribbon take-up spindle rotatable mounted on the bar for receiving a take-up spool of the ribbon material. A magnet is rotatably mounted to the bar and is connected to one of the ribbon supply spindle or the ribbon take-up spindle so as to rotate when the ribbon supply spindle or the ribbon take-up spindle to which it is connected rotates. The magnet has opposed poles on opposite sides thereof. As the magnet rotates, the rotational positions of the poles changes which can be sensed by a sensor in the printer to indicate rotation of the corresponding supply or take-up spindle and thus movement of the ribbon. The rotation axis of the magnet can be offset from the rotation axis of the supply spindle or take-up spindle to which it is connected. The ribbon can be print ribbon or other any type of ribbon used in a desktop card printer. The ribbon cassette can also include a handle that forms a portion of the top surface of the printer housing.

The desktop card printer can also include a scanning station that is configured and arranged to capture an image of one or more surfaces of the card as it passes the scanner. When the scanner is configured to only scan one side surface of the card, a duplex mechanism is preferably provided in the machine to flip the card to enable the other side surface of the card to be scanned.

The desktop card printer can also include a power take-off (PTO) gear adjacent the rear end of the machine. The PTO gear is driven by a drive train within the machine which is driven by a primary drive motor. The PTO gear allows an additional processing mechanism to be mounted at the rear of the machine, with the additional mechanism driven by the primary drive motor of the machine via the PTO gear.

The automatic card feed hopper, the ribbon cassette, the card scanner and the PTO gear described herein can be used together in the desktop card printer, used separately, or used together in various combinations.

DRAWINGS

FIGS. 6A-E illustrate various stages of operation of an operation of the card hopper while picking a card.

Figure 7:
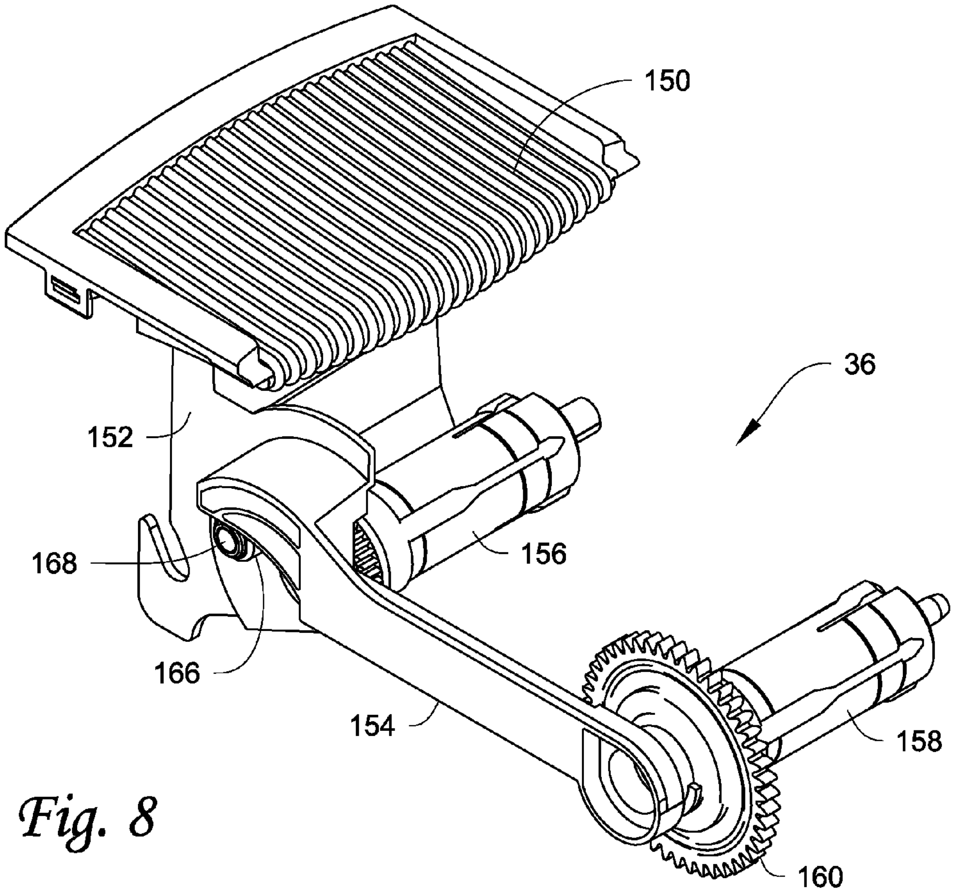

FIG. 7 is a perspective view of a ribbon cassette used with the desktop card printer.

Figure 8:
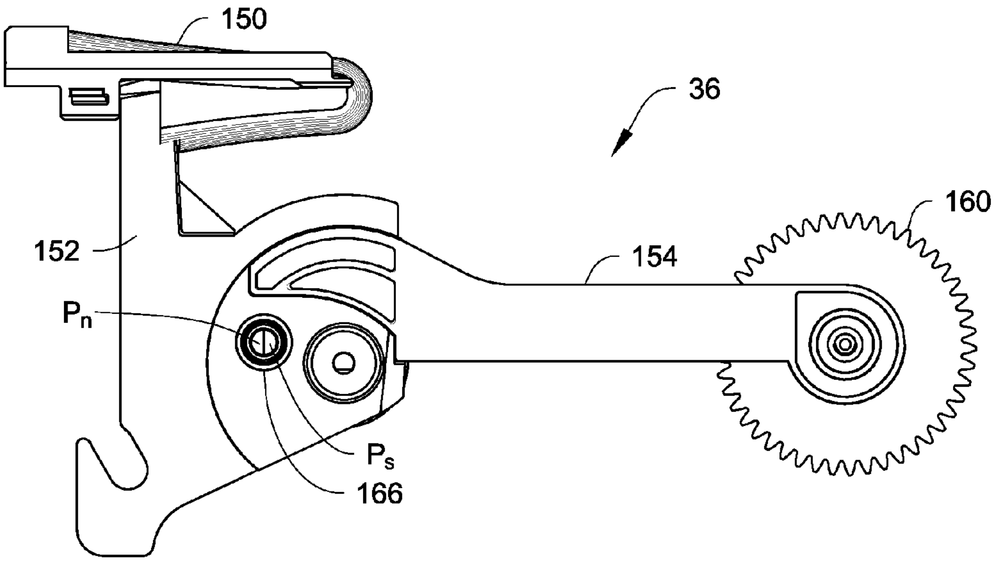

FIG. 8 is a side view of the ribbon cassette.

Figure 9:
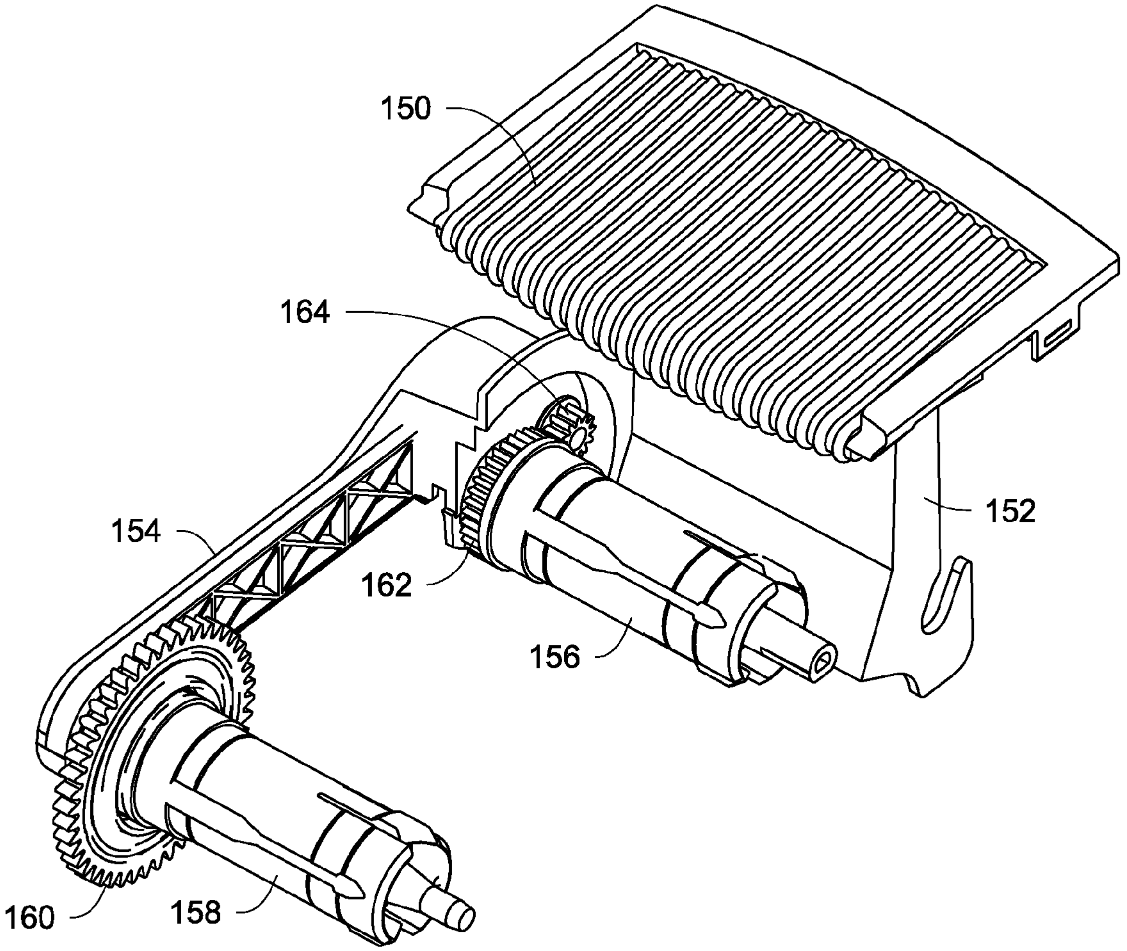

FIG. 9 is another perspective view of the ribbon cassette viewed from the ribbon loading side.

Figure 10:
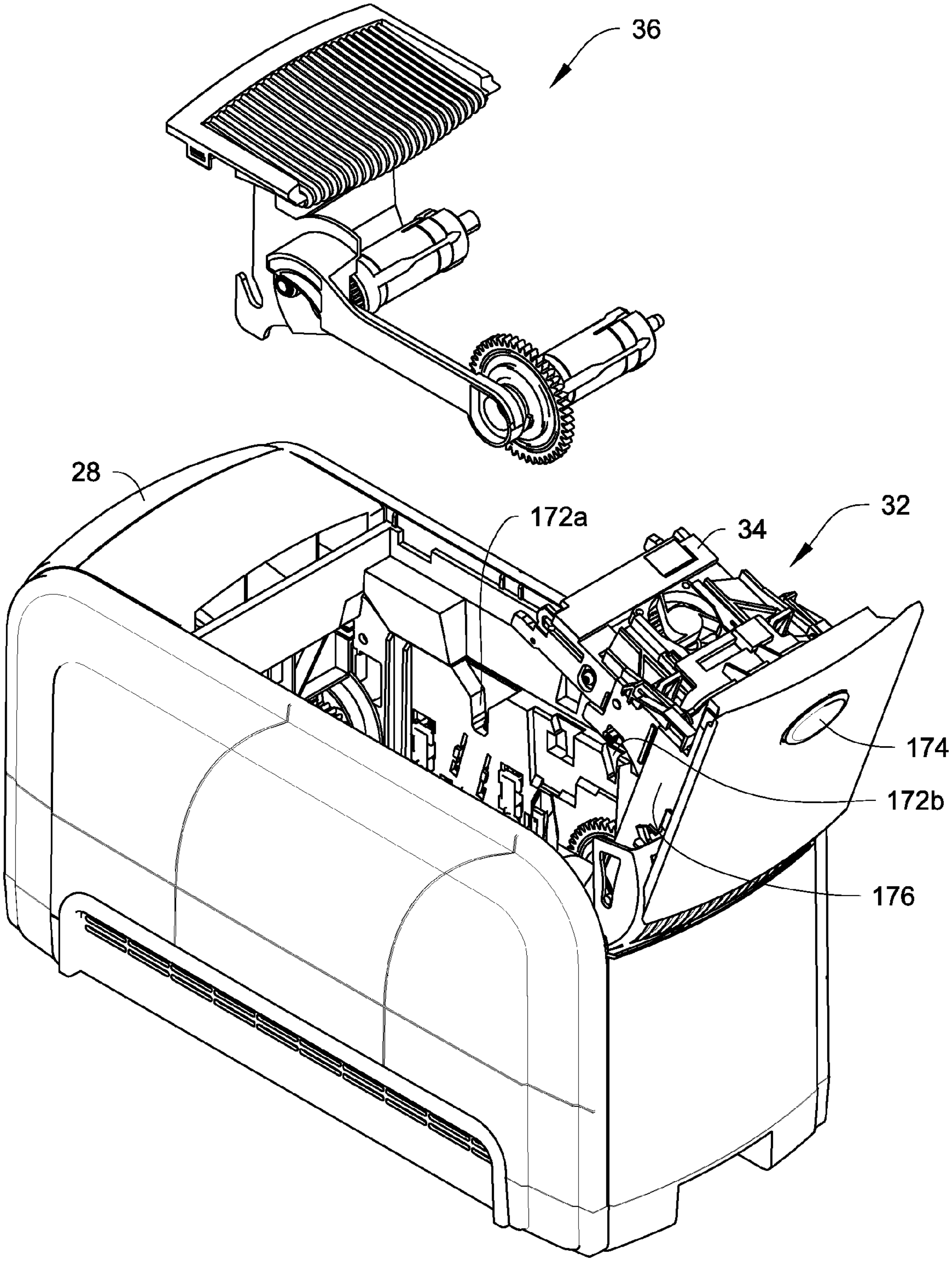
Figure 11:
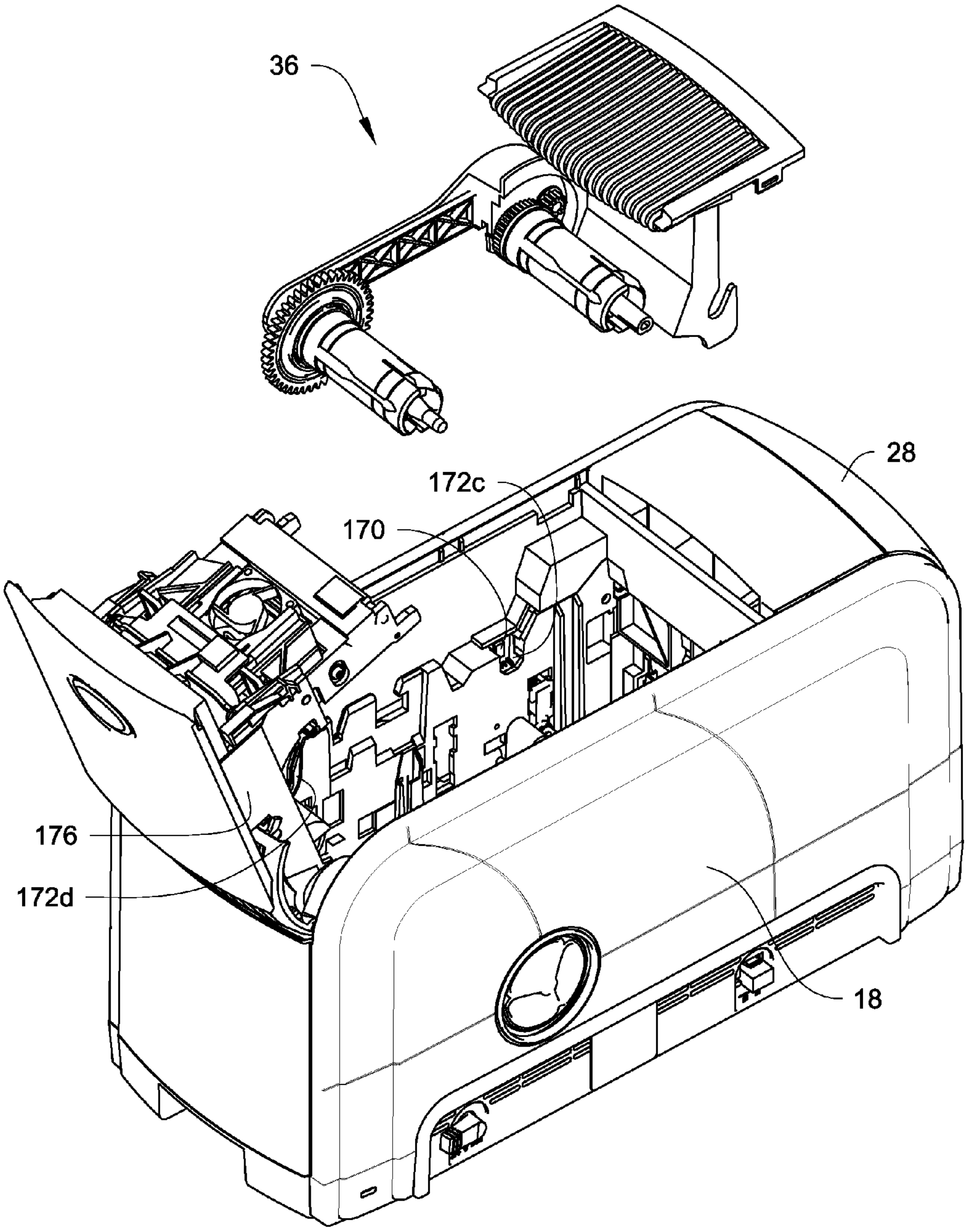

FIGS. 10 and 11 depict how the ribbon cassette is loaded into the desktop card printer.

Figure 12:
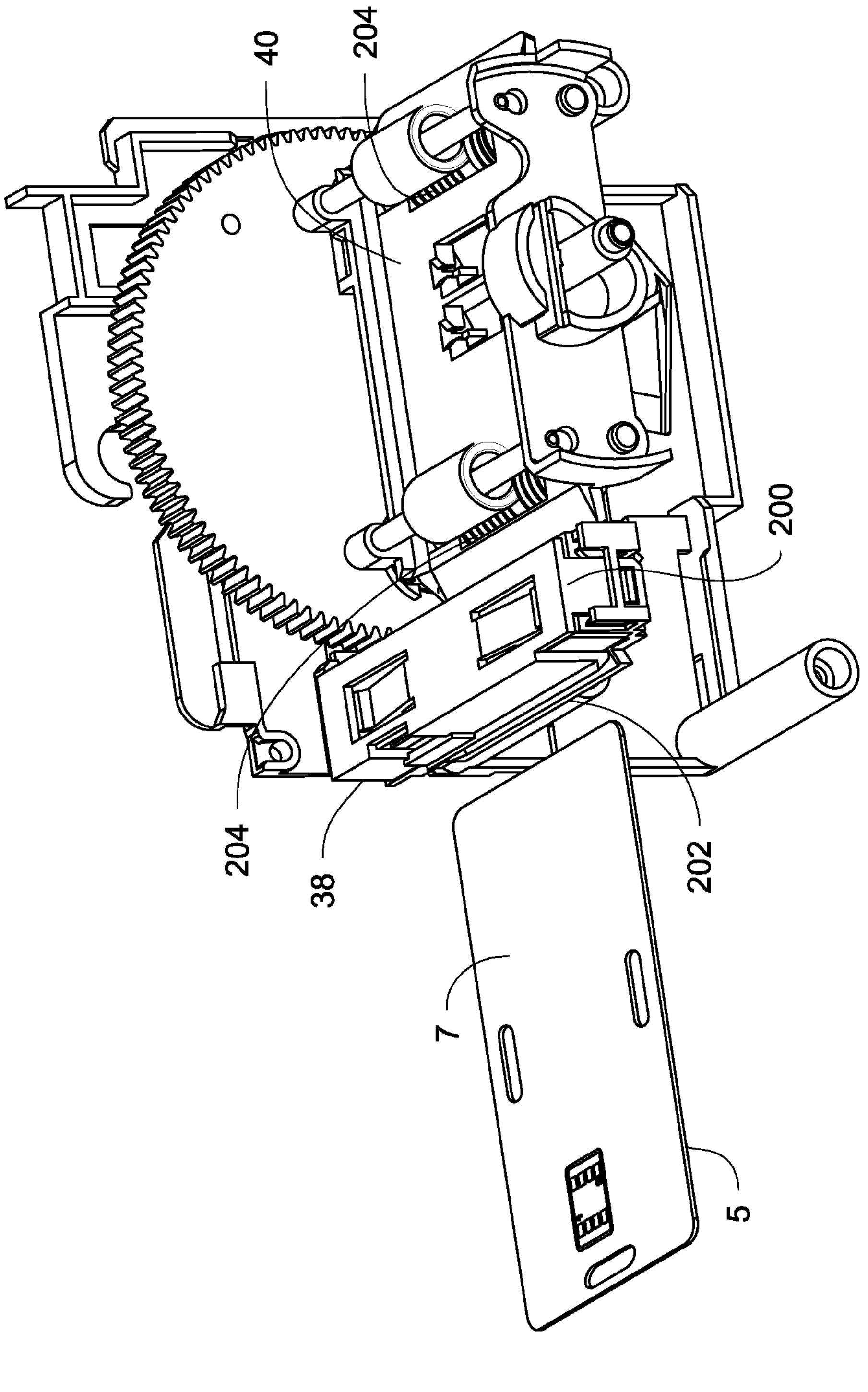

FIG. 12 is a perspective view of a scanning station and a card duplex mechanism used in the desktop card printer.

Figure 13:
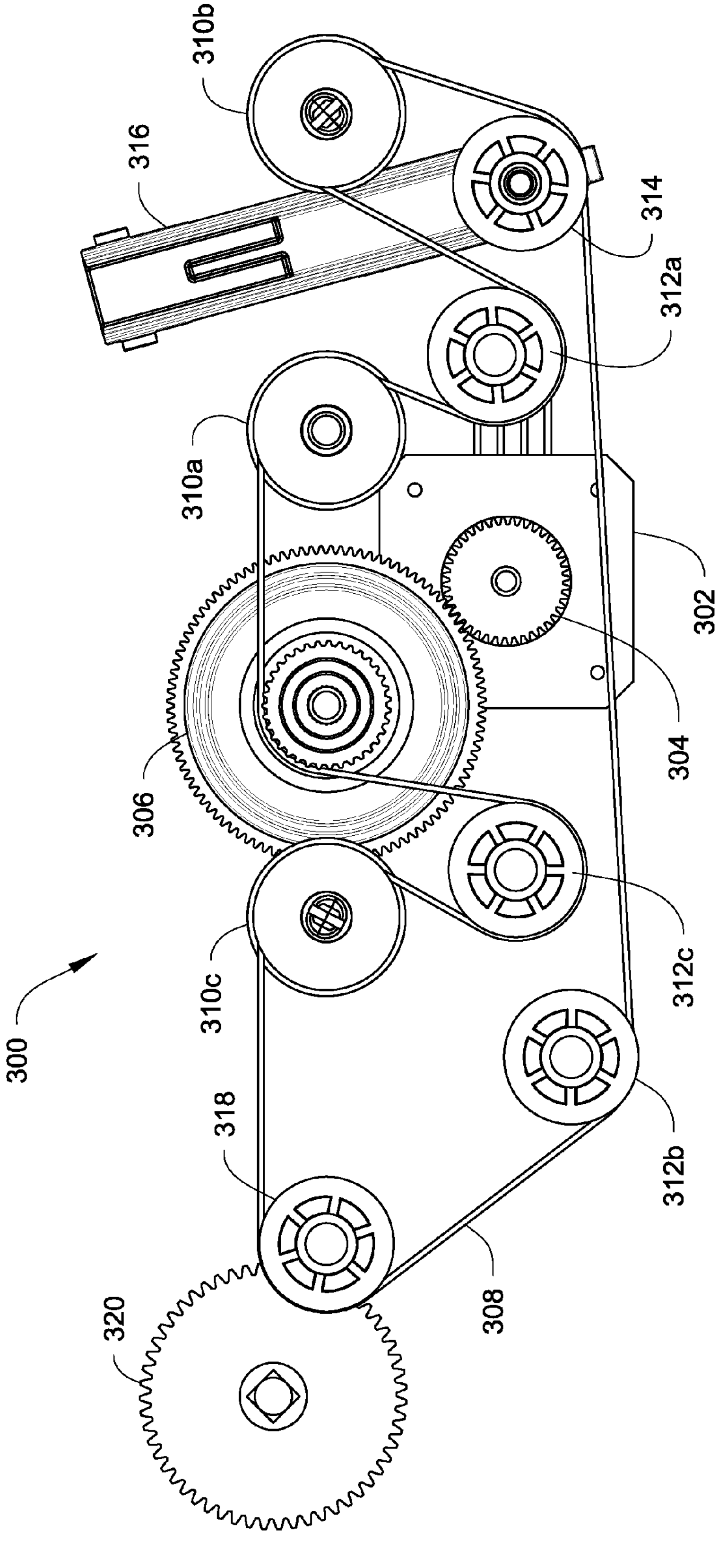

FIG. 13 is a side view of a drive train within the desktop card printer together with a power take-off gear.

DETAILED DESCRIPTION

The inventive concepts will be described in detail with respect to a desktop card printer that performs printing, either monochromatic or multi-color, on plastic cards. However, the inventive concepts described herein could also be implemented on other types of plastic card processing equipment that perform other types of card processing functions either in addition to, or separate from, printing. Other card processing operations include laminating one or more sides of a card, encoding a magnetic stripe on the card, programming a chip embedded in the card, scanning one or more surfaces of the card, and other types of card processing known in the art.

As used herein, a desktop card printer is a card printer that is designed to be relatively small, so that the equipment can fit onto a desk or table. In general, a desktop card printer is intended for lower volume processing of plastic cards, often measured in a relatively small number of cards being processed over a period of time such as an hour, compared to larger volume central issuance machines which are capable of processing upwards of 3000 thousand cards per hour. For example, the desktop printer described herein can process about 1000 cards per hour monochrome, and about 200 cards per hour color. However, in appropriate circumstances, one or more of the inventive concepts described herein could be used on a central issuance-type machine.

In addition, the term "plastic card" will be used to describe the substrate that is being processed. However, the inventive concepts described herein can be used in the processing of other substrates that are formed of materials other than plastic, for example paper or composites (for example a substrate with a PVC receptor layer on each printable surface). The plastic cards are typically ID-1 size plastic cards. However, it is to be realized that the concepts described herein could be used on other card sizes as well.

Figure 1:
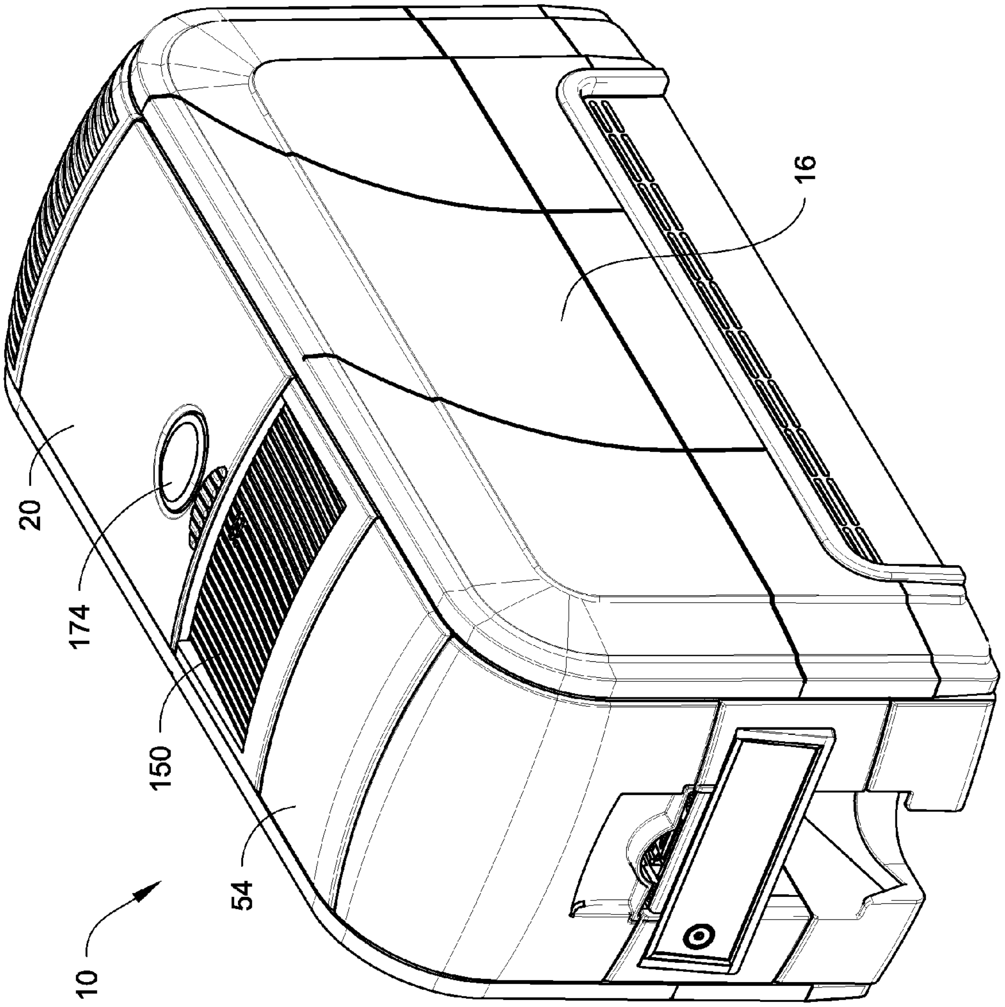
FIG. 1 is a perspective view of a desktop card printer that employs the inventive concepts described herein.
Figure 2:
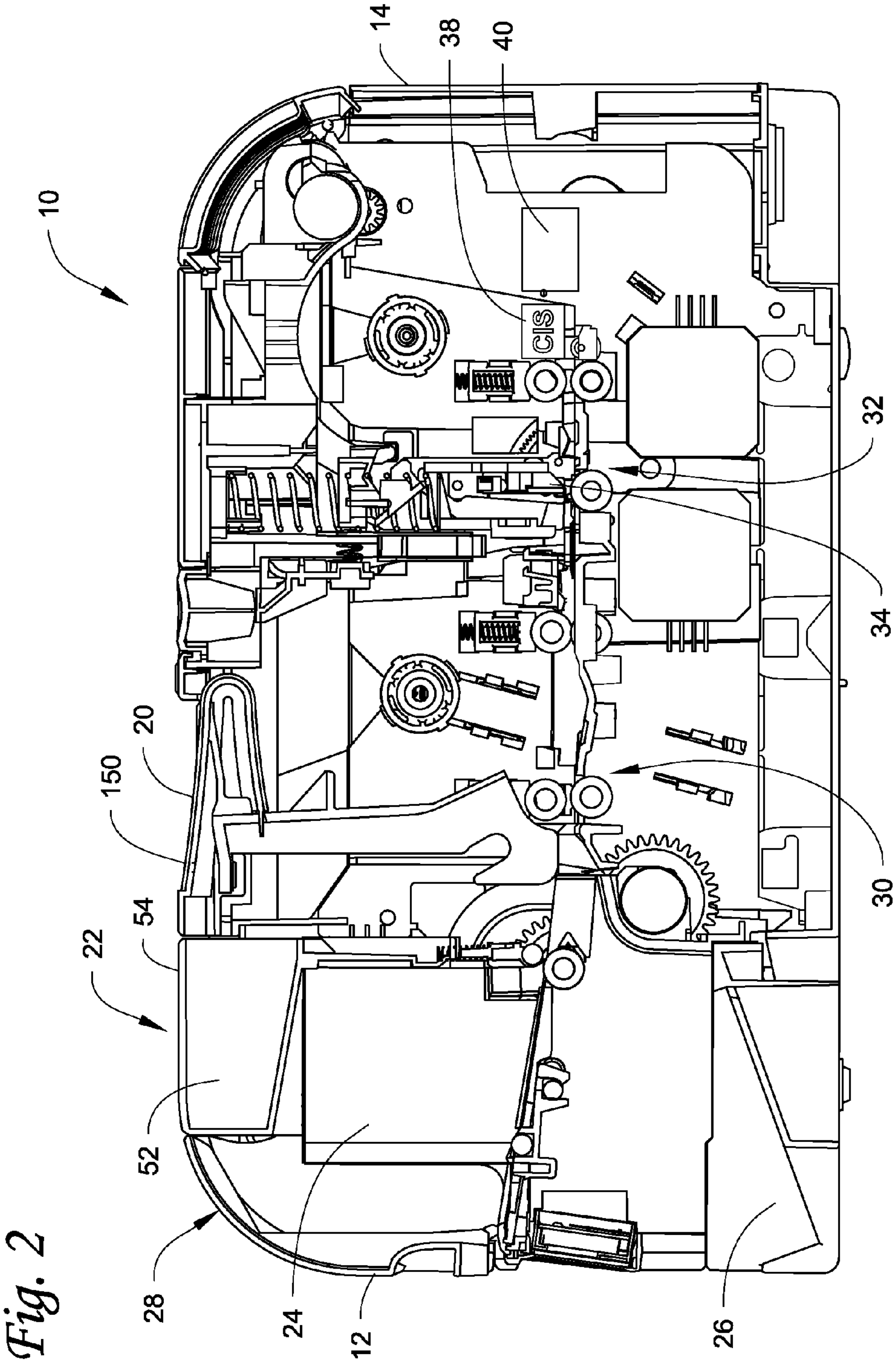
FIG. 2 is a cross-sectional view of the desktop card printer of FIG. 1 from the side showing the interior of the desktop card printer.
Figure 3:
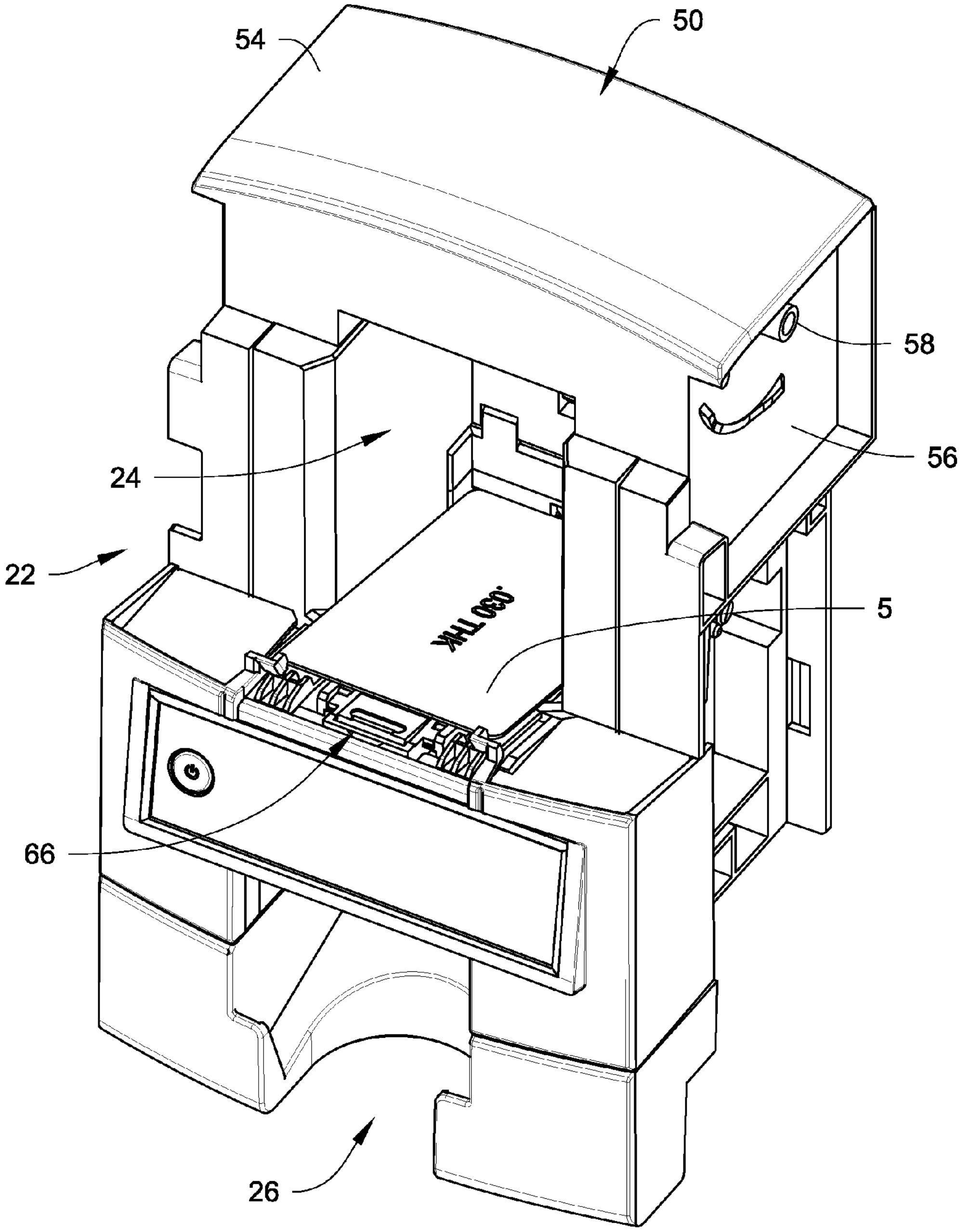
FIG. 3 is a perspective view of a card hopper used with the desktop card printer.
Figure 4B:
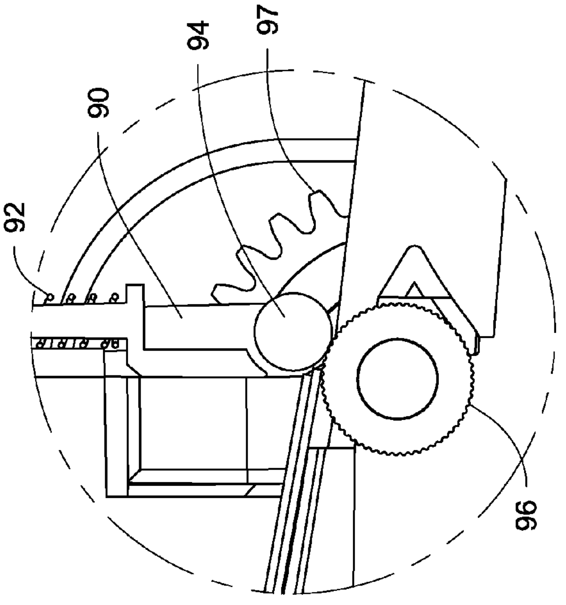
FIG. 4B is a detailed view of the circled portion 4B in FIG. 4A.
Figure 4A:
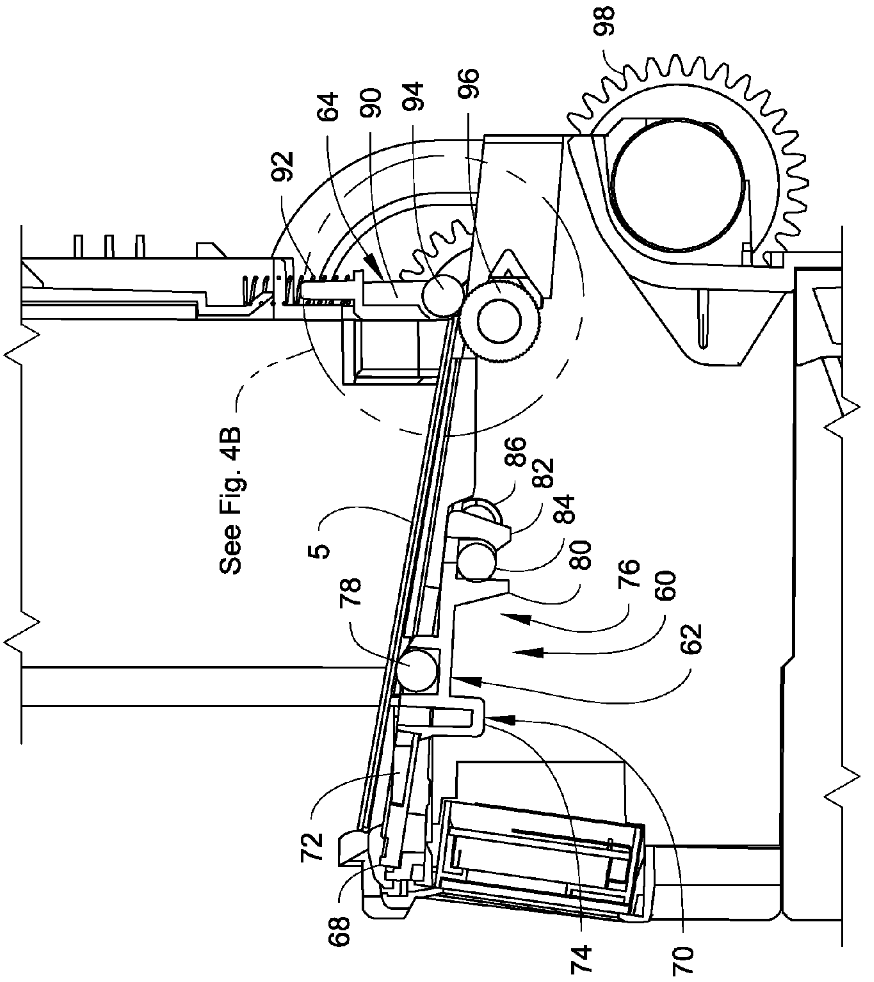
FIG. 4A is a cross-sectional view of a portion of the card hopper from the side.
Figure 4C:
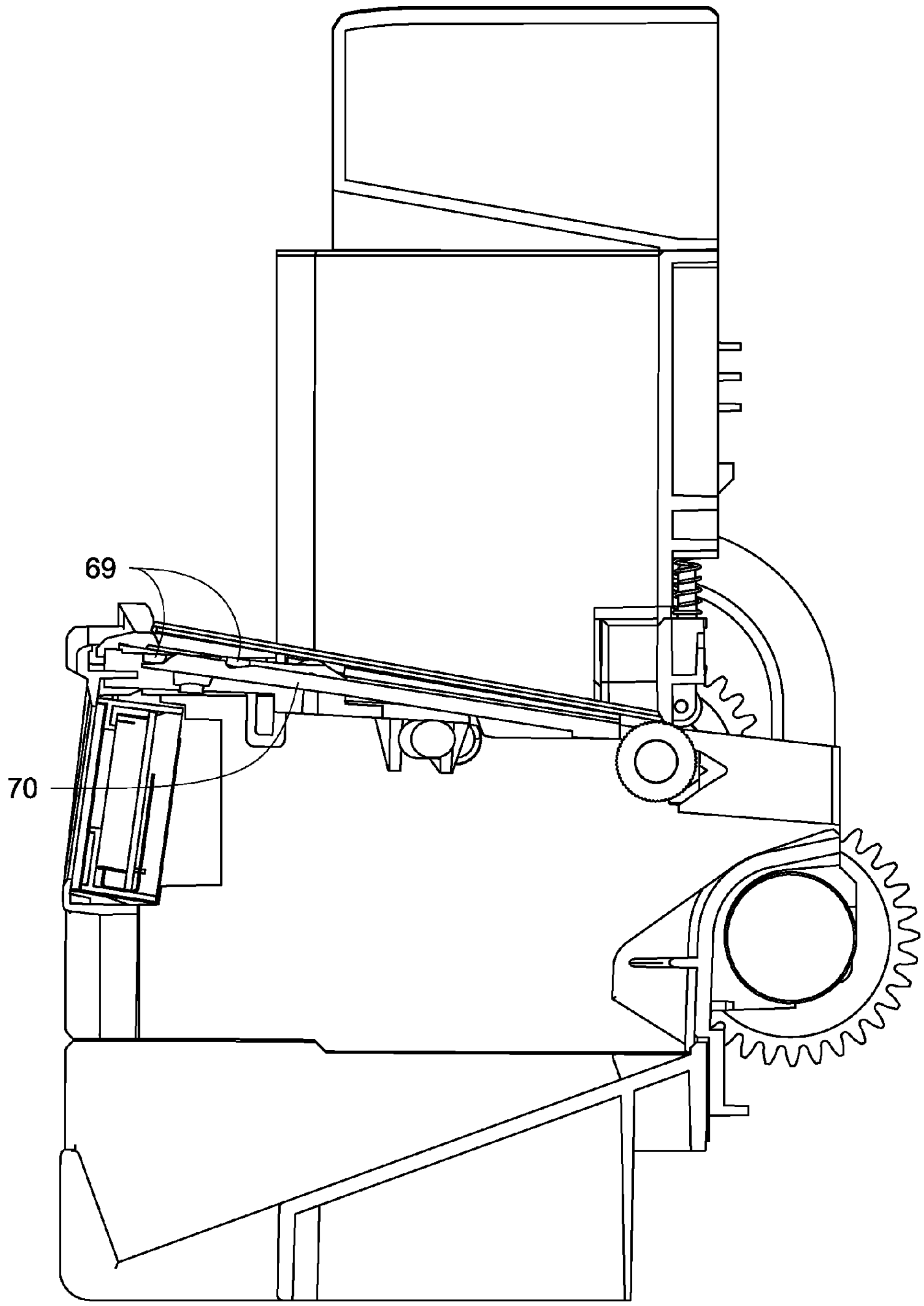
FIG. 4C is another cross-sectional view of the card hopper from the side.
Figure 5:
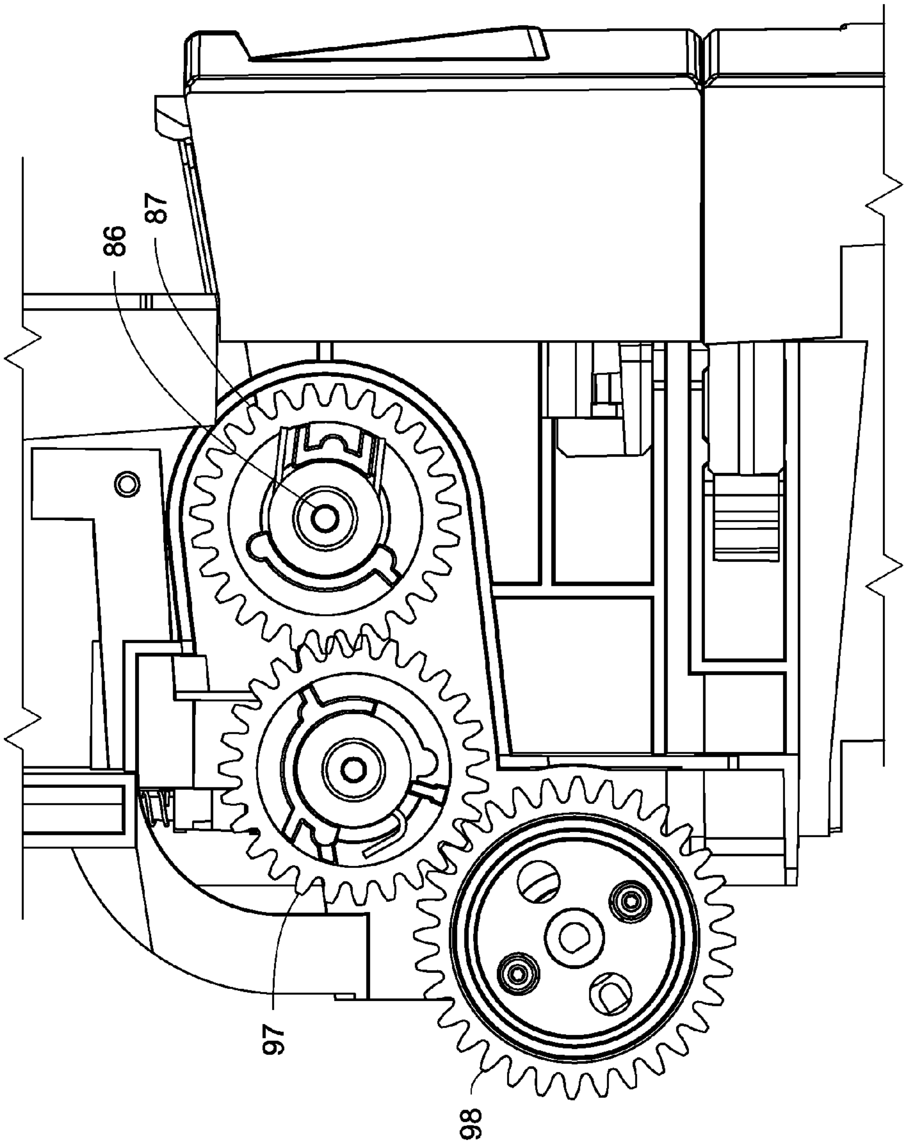
FIG. 5 shows a gear train of the card hopper.

FIGS. 1 and 2 illustrate a desktop card printer 10 that employs the inventive concepts described herein. The printer 10 includes a front or input/output end 12 through which cards enter and exit the printer, and a rear end 14. The printer 10 also includes a first side surface 16, a second side surface 18 (visible in FIG. 11) opposite the first side surface, and a top surface 20.

With reference to FIG. 2, a card hopper 22 is provided at the front end 12. The card hopper 22 includes an input hopper portion 24 that holds a plurality of cards waiting to be processed and that feeds the cards one by one into the printer. The card hopper 22 also includes an output hopper portion 26 that receives the cards after they are processed by the printer 10. The card hopper 22 is an integrated, single unit that includes both the input hopper portion 24 and the output hopper portion 26. As will be discussed further below, the card hopper 22 is designed to be installed and removed as a modular unit to and from the printer.

A pivotable cover 28 (see FIGS. 2, 10 and 11) that forms a part of the printer housing is pivotally disposed over the front end of the input hopper portion 24 for controlling access to the input hopper portion and the cards held therein. The cover 28 is pivotable from a closed position shown in FIG. 2 at which access to the input hopper portion 24 is prevented, to an open position (not shown) which allows access to the input hopper portion to permit the addition/removal of cards.

Returning to FIG. 2, a card that is input from the card hopper 22 is transported through the printer 10 along a substantially linear card transport path by a transport mechanism 30 generally known in the art. A print mechanism 32 is disposed in the card transport path for performing printing operations on the cards. The print mechanism 32 is preferably a thermal print mechanism of a type generally known in the art. The print mechanism 32 includes a thermal print head 34 and a suitable thermal print ribbon carried by a ribbon cassette 36 (see FIGS. 7-11) that is removably disposed within the printer. The ribbon cassette 36 is discussed further below.

Disposed adjacent the rear of the print mechanism 32 along the card transport path is a scanning station 38. Cards exiting the print mechanism 32 are transported to the scanning station 38 for scanning a surface of the card. An optional duplex mechanism 40 is provided adjacent to the scanning station to flip the card to enable the other side surface of the card to be scanned by the scanning station and/or to permit printing on the other side surface of the card. Further details of the scanning station 38 and duplex mechanism 40 are provided below.

The printer generally operates as follows. A card is fed from the input hopper portion and then transported via the transport mechanism 30 to the print mechanism 32 which performs a desired printing operation on one side of the card. After printing is complete, the printed card is transported to the scanning station 38 which scans a surface of the card. If the opposite side of the card needs to be scanned, or printing needs to be performed on the opposite side of the card, the card is transported to the duplex mechanism 40 which flips the card. The card is then transported back to the scanning station and the printer. After all scanning and printing is completed, the card is transported in a reverse direction along the card transport path back to the input/output end 12 where the card is deposited into the output hopper portion 26.

In some circumstances, the scanning may optionally be performed prior to printing. For example, in the case of pre-serialized cards, the cards may be scanned prior to printing to verify the integrity of sequential processing of the cards.

Card Hopper 22

With reference to FIGS. 3-6E, details of the card hopper 22 are illustrated. The card hopper 22 includes an upper portion 50 disposed above the input hopper portion 24 (see FIG. 2). An upper panel 54 of the portion 50 forms a portion of the top surface of the housing of the desktop card printer as evident from FIGS. 1 and 2. The portion 50 also includes sidewalls 56 on the outside surface of which are disposed fixed pivot shafts 58 which are used to pivotally support the card hopper 22 on suitable support structure defined in the printer.

The plastic cards 5 are disposed in the input hopper portion 24 in a vertically stacked arrangement one on top of the other. A card picking mechanism 60 is provided in the card hopper 22 for feeding a single card from the bottom of the stack into the printer. The card picking mechanism 60 includes a card edge assist mechanism 62 and an automatic gate mechanism 64 that function together to feed a card into the printer. The configuration of the card picking mechanism 60 also permits a card exception slot 66 for use in manual feeding of an individual card into the printer.

Figure 6A:
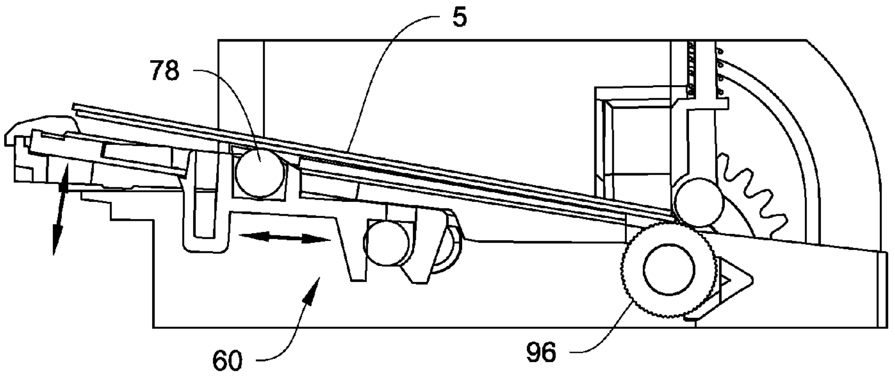
Figure 6B:
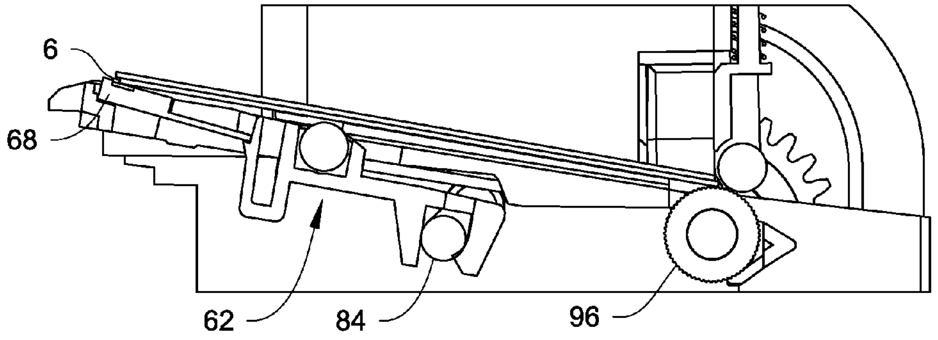

As best seen in FIG. 6B, the card edge assist mechanism 62 is designed to engage a front edge 6 of the bottommost card in the stack during card feeding which helps separate the bottommost card from the next adjacent card during feeding. To accomplish this, the mechanism 62 includes a pick block 68 that is detachably mounted to the end of a mounting element 70. The pick block has a thickness that is generally equal to or less than the thickness of the cards 5 being picked so that the pick block only engages a single card at a time as described further below.

The pick block 68 is preferably made of a material that can withstand the forces associated with engaging the cards over a length of time. For example, the pick block can be made of metal. The pick block 68 has a thinner end 72 that is detachably connected to the mounting element 70, for example by a snap-fit connection. The mounting element 70 is preferably made of plastic and includes a U-shaped end 74 that is detachably connected to the thinner end 72 and an actuated end 76.

In between the U-shaped end 74 and the actuated end 76 is a U-shaped area that rotatably receives therein an idler or dummy roller 78 on which the bottom surface of the card rolls prior to feeding. The idler roller 78 moves with the mounting element 70 and the pick block during card feeding.

The actuated end 76 comprises a downwardly extending flange 80 and a hook 82. An eccentrically mounted drive shaft 84 is disposed between the flange 80 and the hook 82. The shaft 84 is eccentrically mounted on a crank shaft 86 which is driven by a gear 87 shown in FIG. 5. As the crank shaft 86 is rotated (via a slip-clutch located between the crank shaft and the gear 87 which provides a specific, constant torque to the crank shaft) by the gear 87, the eccentric drive shaft 84 engages the actuated end 76, causing the mounting element 70 and the pick block 68 connected thereto to pivot up and down in the direction of the arrows shown in FIG. 6A, as well as move axially as shown by the arrows in FIG. 6A.

The gate mechanism 64 helps control the picking of the cards. The gate mechanism 64 includes a gate 90 that is pivotally mounted at the rear of the card hopper 22. The gate 90 is disposed within an exit slot that is formed through the rear of the card hopper 22 and through which cards exit the card hopper. The gate 90 is biased downward by a spring 92 that extends between the gate 90 and fixed structure of the card hopper. Downward movement of the gate 90 is limited by engagement between the gate and sides of the card hopper that form the exit slot. An idler or dummy roller 94 is mounted on the bottom of the gate 90 and which rolls along the top surface of the card as it is fed into the printer.

The gate 90 is disposed above a pick roller 96 and defines a nip therebetween. The shaft of the pick roller 96 is fixed to a gear 97 so that the pick roller rotates with the gear 97 through a slip-clutch located between the shaft of the pick roller and the gear 97 which provides a specific, constant torque to the shaft. The gear 97 and the gear 87 are driven by a gear 98 to cause rotation of the pick roller 96 and rotation of the crank shaft 87. The gear 98 is driven by a motor that is part of the card hopper 22.

Picking starts by actuating the motor to set the pick roller 96 and the crank shaft 86 in motion. With the pick roller 96 rotating, the spring-loaded gate 90 applies a nip force between the pick roller 96 and the gate mechanism 64. This permits picking of different card thicknesses without adjustment. At the same time, the crank shaft 86 is rotating which actuates the eccentric shaft 84. This causes the card edge assist mechanism 62 to move radially and axially dictated by the position of the eccentric shaft 84.

In most cases, it is expected that the nip force between the pick roller 96 and the gate mechanism 64 will be sufficient to feed a card. However, if the pick roller 96 is unable to advance the card, the pick block 68 will engage the edge 6 of the card to assist in pushing the card into the nip between the roller 94 and the pick roller 96.

With reference to FIGS. 6A-6E, feeding of a card will now be described. In FIG. 6A, the card picking mechanism 60 is in its beginning position with the edges of the stack of cards 5 resting on the picking roller 96 and the idler roller 78. At this position, the pick block 68 is in a down position while the idler roller 78 is in an up position. The pivot point of the picking mechanism 60 is on sliding tabs 69 located on the mounting element 70 between the idler roller 78 and the pick block 68, such that lowering of the idler roller results in raising of the pick block. Also, the sliding tabs 69 ride on contoured rails in the hopper frame that result in vertical translation and axial translation of the mounting element 70 upon horizontal movement. This movement provides room to allow for a card, called an exception card, to be manually placed beneath the bottommost card via the exception slot 66. The exception card insertion needs distance between the pick block and the bottommost card. Once picking is engaged, the card stack drops to allow the pick block to engage the card edge.

With reference to FIG. 6B, once the gear 98 starts rotating, the picking roller 96 attempts to drive the bottommost card (or the exception card if present) into the printer. At the same time, the eccentric shaft 84 begins moving which causes the card edge assist mechanism 62 to begin pivoting upward, causing the idler roller 78 to drop and the pick block 68 to move up. When the pick block raises upward, the pick block comes into contact with the bottom of the card stack and positions the pick block 68 adjacent the edge 6 of the card. This contact force is sufficient to lift the stack slightly, assuring good contact such that the raised edge (i.e. the pick edge of the pick block) will engage the card edge fully upon the pick mechanism sliding toward the gate mechanism.

Figure 6C:
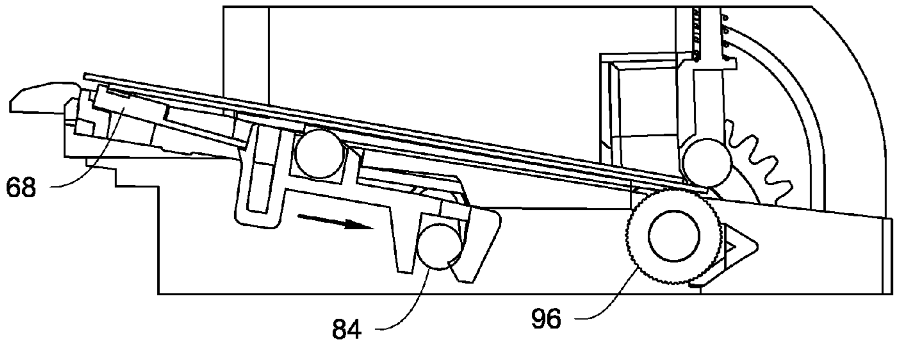

In FIG. 6C, if rotation of the picking roller 96 has not caused the edge of the card to enter the nip between the picking roller 96 and the roller 94, continued rotation of the eccentric shaft 84 causes the card edge assist mechanism 62 to move axially to the right. The pick block 68, which is now engaged with the edge of the card, pushes the opposite edge of the card into the nip. The components are arranged such that shortly after the card edge enters the nip, the card edge assist mechanism 62 engages a wall of the card hopper to stop the axial movement. A slip clutch mechanism is provided between the crank shaft 86 and the gear 87 to permit continued rotation of the picking roller 96 to feed the card into the printer.

Figure 6D:
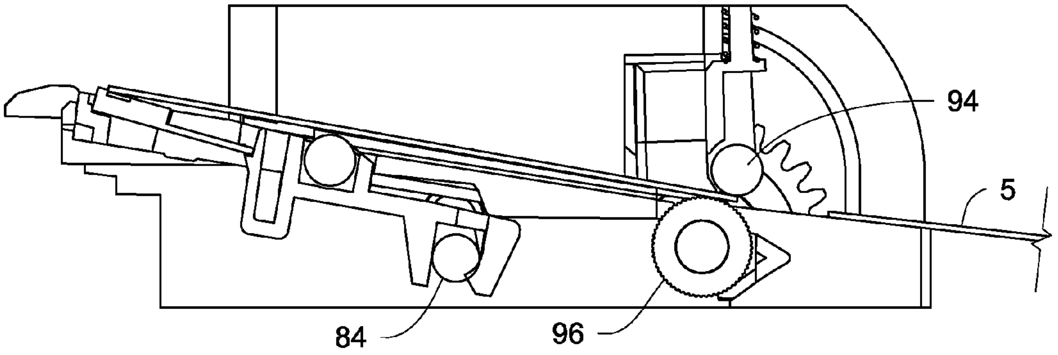
Figure 6E:
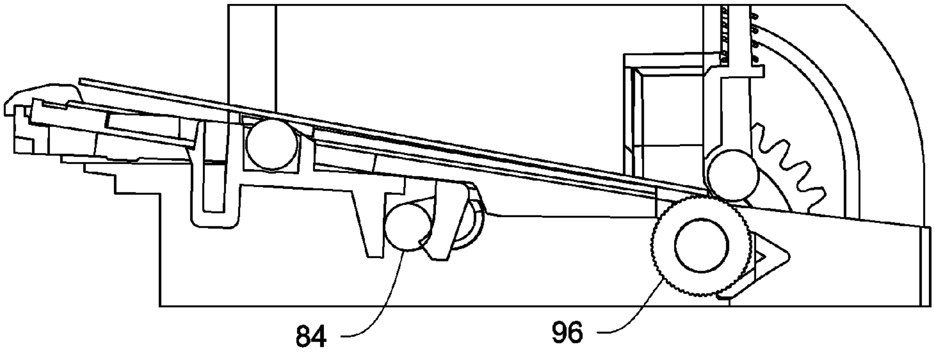

With reference to FIG. 6D, once the card has exited the nip between the picking roller 96 and the roller 94, the gear 98 is stopped being driven which causes the feed mechanism to stop. At this time, the next card could be in the nip so that if an exception card is inserted with the next card already in the nip, two cards will be picked. To prevent the next card from being in the nip, the gear 98 is driven in reverse. As illustrated in FIG. 6E, this causes the picking roller 96 to drive the next card from the nip, as well as reversing the motion of the pick block 68, the eccentric shaft 84, etc. This positions the next card in position to either be picked during the next cycle or allow accepting of an exception card.

Because of the driving force provided by the pick block 68, the angle at the bottom edge of the gate 90 can have a sharper angle of entry to require a larger force for a card to enter the nip, compared to the gate mechanism described in U.S. Pat.

No. 7,398,972, since the pick block can overcome a higher nip resistance. This helps to reduce the chance of a “double pick” situation where a gate edge with a shallower angle is more likely to allow more than one card to be simultaneously picked. In addition, the pick roller can be made of harder durometer material compared to the roller described in U.S. Pat. No. 7,398,972.

Ribbon Cassette 36

The ribbon cassette 36 is designed to permit tracking of the motion of a ribbon mounted that is mounted on the ribbon cassette. Preferably the ribbon cassette employs a magnetic encoder mechanism for tracking ribbon motion. The ribbon cassette will be described herein as being in conjunction with the print mechanism 32, therefore the ribbon mounted on the cassette is a print ribbon. The ribbon can be a monochromatic or multi-color print ribbon. However, the cassette concept can be used with any type of ribbon used in a desktop card printer, for example a laminate ribbon.

With reference to FIGS. 7-9, the ribbon cassette 36 includes a handle portion 150 to allow a user to grip the cassette during installation and removal of the cassette. The handle portion 150 also forms a portion of the top surface 20 of the housing of the desktop card printer as shown in FIGS. 1 and 2. A wall 152 extends downwardly from the handle portion 150, and a bar 154 extends from the wall 152. A ribbon supply spindle 156 is rotatably mounted on the bar 154 for receiving a supply spool of the print ribbon. A ribbon take-up spindle 158 is rotatably mounted on the bar for receiving a take-up spool of the print ribbon. The take-up spindle 158 is driven by a drive gear 160 which, in turn, is driven by a pinion on a dedicated DC motor mounted in the swingarm of the printer. The pinion gear engages the gear 160 upon closing of the swingarm.

As shown in FIG. 9, the supply spindle 156 has a gear 162 that rotates with the supply spindle. The gear 162 can be, for example, integrally molded with the spindle. The gear 162 in turn is engaged with a gear 164. The gear 164 is connected to a shaft 166, for example integrally molded with the shaft 166, that rotatably extends through the bar 154 (see FIGS. 7 and 8). The end of the shaft 166 on the side of the bar opposite the supply spindle is hollowed out, and a magnet 168 is mounted in the hollowed-out end of the shaft 166. The magnet 168 has hemispherically opposed poles, for example north pole $P_n$ and south pole $P_s$ taking up opposite halves of the magnet as shown in FIG. 8. While the magnet 168 is illustrated as being circular, a magnet of any shape, for example rectangular, can be used as long as it has opposed poles on opposite sides of a longitudinal dividing line of the magnet. Because of the hemispherically opposed poles, as the magnet rotates due to rotation of the supply spindle 156, the rotational positions of the poles changes which can be sensed to indicate rotation of the supply spindle and thus movement of the ribbon.

With reference to FIG. 11, a sensor 170 is provided in the printer for sensing the magnet as well as rotation of the magnet when the ribbon cassette is installed in the printer. The gear ratio between the gears 162, 164 is selected to increase the resolution of the supply spindle's 156 motion which results in rotation of the magnet 168. In general, the higher the gear ratio, the higher the resolution. It has been found that a 3:1 gear ratio is satisfactory. However, it is to be realized that other gear ratios could be used.

As evident from FIGS. 7-9, the rotation axis of the shaft 166 and magnet 168 is offset from the rotation axis of the supply spindle 156. This allows for use of a smaller sensor 170.

The ribbon cassette 36 is removably mountable in the printer housing through the top of the printer as indicated in FIGS. 10 and 11. Suitable support structures 172*a*, 172*b*, 172*c*, 172*d* are provided on the side walls within the printer housing to support the cassette 36. From a closed configuration of the printer as shown in FIG. 1, a user pushes a button 174. This pops open a portion of the print mechanism 32 mounted on a swing mechanism 176, including the print head 34, which can be swung open as shown in FIGS. 10 and 11. The user then grasps the handle portion 150 and lifts the cassette 36 upward removing the cassette from the printer. Installation of the cassette 36 is just the opposite, with the user using the handle portion 150 to lower the cassette into the printer. Once the cassette is installed, the swing mechanism 176 is swung back into position to bring the print head back into appropriate position ready for printing.

Since the magnet 168 rotates with the supply spindle, as print ribbon is pulled from the supply spool, the motion of the ribbon as well as the amount of ribbon can be tracked based on the measured rotation of the magnet. In addition, the mere sensing of the magnet by the sensor 170 when the ribbon cassette is installed can be used as an indicator that the ribbon cassette is or is not present. Since the handle portion of the ribbon cassette forms a portion of the top surface of the housing, if the ribbon cassette is not installed, there will be a hole in the top of the printer. Since foreign objects, contaminants, a user's fingers, etc. could enter the printer through the hole of the cassette is not installed, the printer is configured to not operate if the cassette is not present which is indicated by the sensor not sensing the magnet.

Scanning Station 38

FIG. 12 illustrates the scanning station 38. The scanning station 38 is used to scan at least one surface of the card 5 in order to capture an image of the card. The scanning station is located near the rear of the printer, downstream of the print mechanism 32, on the card transport path. After exiting the print mechanism, the card 5 is transported by the transport mechanism 30 to the scanning station 38.

The scanning station 38 includes a scanner housing 200 and a scanner disposed in the scanner housing that is positioned to scan at least one surface of the card to capture an image of the card surface that has been scanned. The scanner housing 200 includes an input slot 202 through which the card 5 initially enters the scanner housing, as well as card guide and spring bias features for maintaining a fixed distance between the card scanner and the card surface. The scanner in the housing can either be mounted above the card transport path to scan the upper surface 7 of the card, or mounted below the card transport path to scan the lower surface of the card. The scanning station 38 can also be configured to simultaneously scan both the upper and lower surfaces of the card, for example using separate scanners in the scanner housing disposed on opposite sides of the transport path.

The scanner can capture some or the entire surface of the card. Examples of suitable types of scanners that could be used include, but are not limited to, contact image scanners or optical flatbed scanners. The scanner is, for example, similar in operation to a conventional paper scanner. The contact image scanner functions as a line scanner, with the card transport mechanism 30 providing the card movement across the scanner. An alternative scanning method would be to use an area-image engine. An area-image engine takes an image of the card while it is held stationary in front of the imaging device. The data capture can occur in the printer which would contain suitable memory, or in a networked computer. Post processing of the captured image would then occur to identify and read data of interest from the card, for example a barcode, text, a photograph, or other data types of interest.

When the scanner is configured to scan only one side of the card, the optional duplex mechanism 40 can be provided. As would be understood by a person of ordinary skill in the art, the duplex mechanism 40 is designed to receive the card from the scanning station 38, flip the card so that the previously upward facing surface is now facing downward and the previously downward facing surface is now facing upward, and return the flipped card to the scanner to scan the other surface of the card. Transport rollers 204 on the duplex mechanism 40 help transport the card through the scanning station and well as back into the scanning station. An example of a suitable duplex mechanism is disclosed in U.S. Pat. No. 7,398,972.

Personalized cards can include several types of barcodes (e.g. 1-D and 2-D), font that is recognizable by optical character recognition (OCR), or other recognizable features pre-applied to the card (if scanned before printing) or features printed by the print mechanism (if scanned after printing) at various locations and orientations on the card depending upon customer requirements. The ability to capture images of all or a portion of the card surfaces would allow for post processing of a variety of card information examples of which are described above. Area-image engines can capture most of the card surface. However, since the card is held stationary in card guides and drive rollers, portions of the card surface are not viewable. Scanning a card using a contact-image scanner will capture the entire card surface because the whole card is passed across the scanner.

The ability to capture images of the card surface allows for post processing of a barcode on the card. Currently, there are several types of barcodes (e.g. 1D, 2D, vertical, horizontal etc. . . . ) used on cards. The barcodes are read by a barcode reader often located in a custom position and orientation in the card printer. In some cases, the barcode length actually exceeds the distance between drive rollers, making the barcode impossible to read. In addition, scanning the card permits post processing and recognition of human readable characters (e.g. optical character recognition or OCR). Scanning also permits card image verification and archiving, for example storing a record of the card, and what data and imagery was actually produced on the card.

Drive Train

With reference to FIG. 13, the desktop card printer can also include a drive train 300 disposed therein which uses a single drive motor 302 for driving card movement through the printer 10 as well as through any modules added onto the rear of the printer. Previously, when a processing module, for example a duplex mechanism, was added onto the rear end of a printer, the added processing module was provided with a separate drive motor for providing card transport. The drive train 300 eliminates the need for a separate drive motor on an added processing module.

The drive motor 302 is a reversible motor that drives a main drive gear 304 that in turn is engaged with a drive gear/pulley combination 306. A drive belt 308 runs around a plurality of drive pulleys 310*a*, 310*b*, 310*c*, as well as a plurality of idler pulleys 312*a*, 312*b*, 312*c*. A tensioner pulley 314 is adjustably supported on a slide mechanism 316 for use in adjusting the position of the tensioner pulley 314, thereby adjusting the tension in the belt 308. The tension is applied to the slide mechanism 316 by a spring which pushes downward on the slide mechanism.

A pulley/driven gear combination 318 is provided adjacent the rear of the drive train 300, and the driven gear of the combination 318 is engaged with a power take-off (PTO) gear 320. The PTO gear 320 is disposed adjacent the rear end of the printer 10 so that when a processing module is mounted to the rear of the printer, a gear provided on the processing module can engage with the PTO gear 320 so that motive force from the drive motor 302 is transferred to the added processing module.

The invention may be embodied in other forms without departing from the spirit or novel characteristics thereof. The embodiments disclosed in this application are to be considered in all respects as illustrative and not limitative. The scope of the invention is indicated by the appended claims rather than by the foregoing description; and all changes which come within the meaning and range of equivalency of the claims are intended to be embraced therein.

The invention claimed is:

1. A desktop card printer, comprising:

a housing having a first end and a second end, a first side surface and a second side surface, and a top surface;

a card hopper mounted to the housing at the first end thereof the card hopper includes a card input hopper portion that is configured to hold a plurality of cards to be processed by the desktop card printer;

the card hopper includes a card picking mechanism that is configured and arranged to pick and feed a single card from the plurality of cards within the card input hopper portion into the desktop card printer for processing;

the card picking mechanism includes an automatic gate mechanism that is disposed at a discharge side of the card input hopper portion adjacent first edges of the cards and is configured and arranged to control the discharge of cards from the card input hopper portion into the desktop card printer, and a card edge assist mechanism that is configured and arranged to engage a second edge of a card to be picked to help separate the card to be picked from the remainder of the cards in the card input hopper portion;

a card output;

a card processing mechanism within the housing;

a card transport mechanism within the housing that is configured and arranged to receive a picked card from the card input hopper portion and to transport the picked card within the housing to the card processing mechanism and to the card output;

the card edge assist mechanism includes a pick block that is detachably mounted to a mounting element, and the pick block and the mounting element are movable axially as well as up and down; and the card edge assist mechanism further includes an idler roller mounted on the mounting element and that moves therewith, the idler roller being positioned to rotatably engage a bottom surface of the card to be picked.

2. The desktop card printer of claim 1, wherein the card input hopper portion is configured to hold the plurality of cards in a vertically stacked arrangement one on top of the other.

3. The desktop card printer of claim 1, wherein the card edge assist mechanism includes a pick block that is detachably mounted to a mounting element, and the pick block and the mounting element are movable back and forth as well as up and down.

4. The desktop card printer of claim 3, wherein the pick block has a thickness that is equal to or less than a thickness of the cards so that the pick block only engages a single card at a time.

5. The desktop card printer of claim 3, wherein the card hopper further includes a card exception slot.

6. The desktop card printer of claim 1, wherein the card output comprises an output hopper portion, and the card hopper is an integrated, single unit that includes the card input hopper portion and the card output hopper portion; and the card hopper is removable as a single unit from the desktop card printer.

7. The desktop card printer of claim 6, wherein an upper panel of the card hopper forms a portion of the top surface of the housing.

8. The desktop card printer of claim 1, wherein the card processing mechanism comprises a thermal print mechanism.

9. A desktop card printer, comprising:

a housing having a first end and a second end, a first side surface and a second side surface, and a top surface;

a card hopper mounted to the housing at the first end thereof, the card hopper includes a card input hopper portion that is configured to hold a plurality of cards to be processed by the desktop card printer;

the card hopper includes a card picking mechanism that is configured and arranged to pick and feed a single card from the plurality of cards within the card input hopper portion into the desktop card printer for processing;

the card picking mechanism includes an automatic gate mechanism that is disposed at a discharge side of the card input hopper portion adjacent first edges of the cards and is configured and arranged to control the discharge of cards from the card input hopper portion into the desktop card printer, and a card edge assist mechanism that is configured and arranged to engage a second edge of a card to be picked to help separate the card to be picked from the remainder of the cards in the card input hopper portion;

a card output;

a card processing mechanism within the housing;

a card transport mechanism within the housing that is configured and arranged to receive a picked card from the card input hopper portion and to transport the picked card within the housing to the card processing mechanism and to the card output;

the card edge assist mechanism includes a pick block that is detachably mounted to a mounting element, and the pick block and the mounting element are movable axially as well as up and down;

the automatic gate mechanism includes a gate disposed in an exit slot, the gate is biased downward, and an idler roller is mounted to a bottom edge of the gate; and a driven pick roller disposed opposite the idler roller and defining a nip therebetween;

the pick block and the mounting element are driven by a shaft eccentrically mounted on a crank shaft, the crank shaft is driven by a first gear, and a slip-clutch is provided between the crank shaft and the first gear;

the pick roller is driven by a second gear, and a slip-clutch is provided between the pick roller and the second gear; and the first gear and the second gear are driven by a third gear that is driven by a motor that is part of the card hopper, and the third gear is drivable in forward and reverse directions.

* * * * *